US011968513B2

(12) United States Patent
Xiao et al.

(10) Patent No.: US 11,968,513 B2
(45) Date of Patent: Apr. 23, 2024

(54) VIBRATION SOUNDING DEVICE

(71) Applicant: AAC Microtech (Changzhou) Co., Ltd., Changzhou (CN)

(72) Inventors: Bo Xiao, Shenzhen (CN); Chenliang Kong, Shenzhen (CN); Tong Zhang, Shenzhen (CN); Ronglin Linghu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 200 days.

(21) Appl. No.: 17/833,880

(22) Filed: Jun. 6, 2022

(65) Prior Publication Data

US 2023/0292053 A1 Sep. 14, 2023

(30) Foreign Application Priority Data

Mar. 9, 2022 (CN) ......................... 202220494975.4

(51) Int. Cl.

| | |
|---|---|
| ***H04R 9/06*** | (2006.01) |
| ***H04R 1/02*** | (2006.01) |
| ***H04R 7/12*** | (2006.01) |
| ***H04R 9/02*** | (2006.01) |
| ***H04R 9/04*** | (2006.01) |

(52) U.S. Cl.
CPC ............... *H04R 9/06* (2013.01); *H04R 1/025* (2013.01); *H04R 7/12* (2013.01); *H04R 9/025* (2013.01); *H04R 9/045* (2013.01); *H04R 2499/11* (2013.01)

(58) Field of Classification Search
None
See application file for complete search history.

(56) References Cited

U.S. PATENT DOCUMENTS

2012/0170792 A1* 7/2012 Li .......................... H04R 9/066
381/412

* cited by examiner

*Primary Examiner* — Duc Nguyen
*Assistant Examiner* — Assad Mohammed
(74) *Attorney, Agent, or Firm* — W&G Law Group

(57) ABSTRACT

The application discloses a vibration sounding device including a housing body with a containment cavity, a sounding unit placed in the containment cavity, a weight, a drive coil and a spring plate. The spring plate includes a first fixed section for fixed connection with the weight and a second fixed section for fixed connection with the housing body. The first fixed section and the second fixed section are fixed by laser spot welding. Compared with the prior art, the first fixed section and the second fixed section are fixed by laser spot welding, which can improve the bonding strength between the first fixed section and the second fixed section, and ensures the strength of the spring plate when the vibration sounding device is working.

10 Claims, 7 Drawing Sheets

VIBRATION SOUNDING DEVICE

FIELD OF THE PRESENT DISCLOSURE

The invention relates to the technical field of electro-acoustic transducers, in particular to a vibration sounding device.

DESCRIPTION OF RELATED ART

With the development of electronic technology, portable consumer electronic product is more and more sought after by people, such as mobile phones, handheld game consoles, navigation devices or handheld multimedia entertainment equipment, etc. Generally, vibration sounding device is used for system feedback, such as mobile phone call prompts, information prompts, navigation prompts, and vibration feedback from game consoles. Such a wide range of applications requires high performance and long service life of the vibration sounding device.

The vibration sounding device currently used in portable consumer electronic products has the spring plate welded on the weight. During the working process of the vibration sounding device, through the alternating current in the coil, the magnetic field line of the magnet is cut to generate an induced electromotive force. It makes the sounding unit vibrate up and down under the support of the spring plate, thereby providing vibration.

When the vibration sounding device is working, the spring plate is reciprocally deformed, which is easy to cause the spring plate to break at the force concentration, which has a great impact on the strength of the spring plate and further affects the life of the vibration sounding device.

SUMMARY OF THE PRESENT INVENTION

The purpose of the present invention is to provide a vibration sounding device which can reduce the force of the spring plate in its force concentration, increase the strength of the spring plate and the life of the vibration sounding device.

Accordingly, the present invention provides a vibration sounding device, comprising: a housing body with a containment cavity; a vibration system including a sound membrane and a voice coil for driving the sound membrane to vibrate; a magnetic circuit system for driving the vibration system to generate sound in a first direction, including a main magnet and a secondary magnet arranged around the main magnet for forming a magnetic gap; a sounding unit formed by the vibration system and the magnetic circuit system; a weight; and a drive coil fixed on and movable with the weight along a second direction which is perpendicular to the first direction.

The drive coil includes a first side edge spaced from the main magnet, and a second side edge opposite to the first side edge and spaced from the secondary magnet. The vibration sounding device further includes a spring plate for connecting with and suspending the weight in the containment cavity.

The spring plate includes a first fixed section connecting with the weight and a second fixed section connecting with the housing body. The first fixed section includes a first main body connecting with the weight, two first connection arms and two first arc bending parts symmetrically arranged on opposite sides of the first main body; opposite ends of the first connection arms are respectively connected to the first main body and the first arc bending part.

The second fixed section includes a second main body connecting with the housing body, a second connection arm and a second arc bending part; opposite ends of the second connection arm are respectively connected to the second main body and the second arc bending part. The first arc bending part and the second arc bending part are fixed by laser spot welding.

In addition, the sound membrane forms a separator connected to an inner wall of the housing body for separating the containment cavity into a front cavity and a rear cavity.

In addition, a polarity of an end of the main magnet facing the drive coil is opposite to an polarity of an end of the secondary magnet facing the drive coil.

In addition, the first side edge and the second side edge together form a wire winding hole, and in the first direction, the wire winding hole and the magnetic gap are disposed opposite to each other.

In addition, the first connection arm includes a groove recessed and formed in an edge of the first connection arm along the first direction.

In addition, the grooves are symmetrically distributed on opposite sides of the first connection arm.

In addition, an inner contour surface of the groove is a circular arc shape or a spline curve shape.

In addition, the vibration sounding device includes two second fixed sections symmetrically arranged on opposite sides of the first fixed section.

In addition, a radius of curvature of the first arc bending part and the second arc bending part are equal.

In addition, the first main body and the weight and the second main body and the housing body are all fixed by welding.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
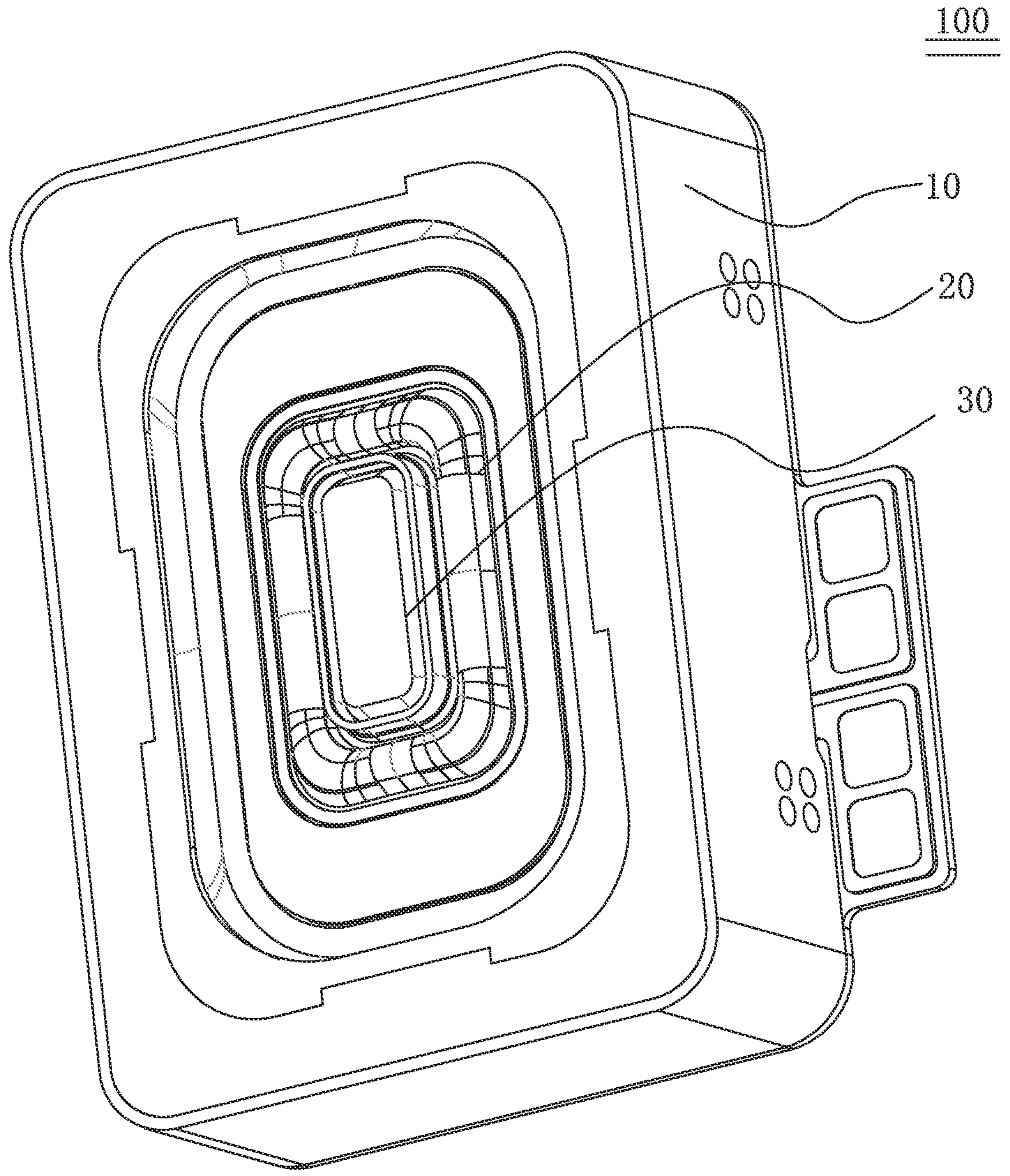
FIG. 1 is an isometric view of a vibration sounding device in accordance with an embodiment provided by the application.
Figure 2:
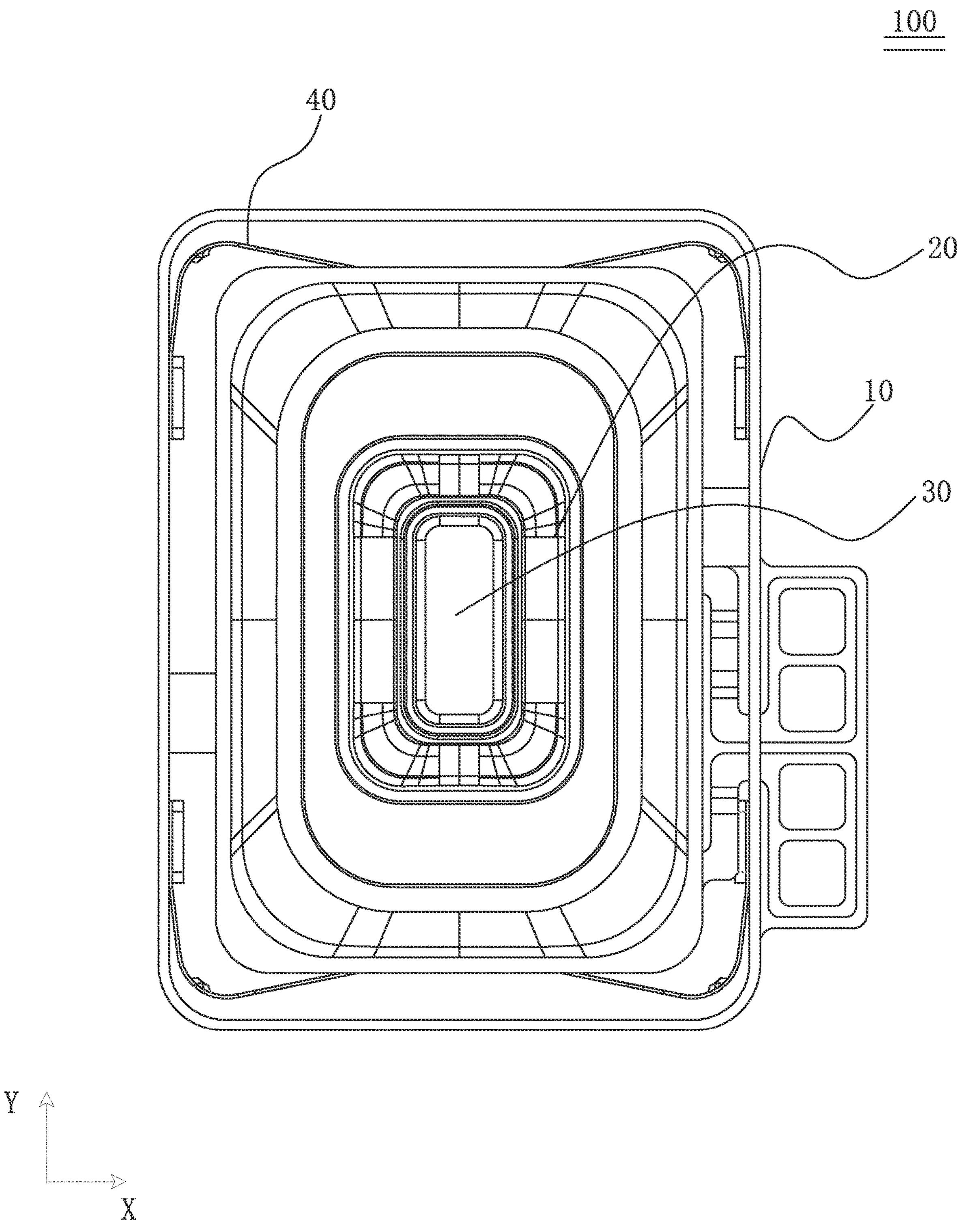
FIG. 2 is a front view of the vibration sounding device in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

With the development of electronic technology, portable consumer electronic product is more and more sought after by people, such as mobile phones, handheld game consoles, navigation devices or handheld multimedia entertainment equipment. These electronic products generally use vibration sounding devices for system feedback, such as mobile phone call prompts, information prompts, navigation prompts, and vibration feedback from game consoles.

In the related art, the vibration sounding device includes a housing body, a sounding unit, a weight, and a spring plate accommodated in the housing body, and the spring plate is connected to the weight and the housing body. However, in the traditional scheme, the used spring plate is subjected to repeated deformation during the weight vibration process, which is prone to fatigue fracture in the force concentration area. This has a great influence on the strength of the spring plate, which further affects the life of the vibration sounding device.

In order to solve the technical problem that the spring plate is prone to breakage in the force concentration area in the prior art, the applicant designed a new vibration sounding device for this purpose. It can reduce the force of the spring plate in its force concentration, increase the strength of the spring plate and the life of the vibration sounding device.

In order to better explain this embodiment, a three-dimensional coordinate system is specially formulated, the Z direction is defined as the first direction, the X direction is defined as the second direction, the Y direction is defined as the third direction, the first direction is the vibration direction of the vibration system, and the second direction is the vibration direction of the weight. The second direction is perpendicular to the first direction, and the third direction is perpendicular to both the first and second directions.

Referring to FIGS. 1-9, the application provides a vibration sounding device 100 including a housing body 10 having a containment cavity 10*a*, a sounding unit placed in the containment cavity 10*a*, and a spring plate 40. The housing body 10 includes a bottom wall 11 and a top wall 12 oppositely disposed in the first direction, and a peripheral wall 13 connected between the bottom wall 11 and the top wall 12. The peripheral wall 13, the bottom wall 11 and the top wall 12 together form a containment cavity 10*a*.

Referring to FIGS. 1-6, the sounding unit includes a vibration system and a magnetic circuit system 30 that drives the vibration system 20 to vibrate and sound in the first direction. The magnetic circuit system 30 includes a main magnet 31 and a secondary magnet 32 disposed around the main magnet 31 to form a magnetic gap 33. The vibration system 20 includes a sound membrane 21 and a voice coil 22 inserted in the magnetic gap 33 to drive the sound membrane 21 to vibrate and sound. A flexible circuit board 39 is electrically connected to the voice coil 22. The voice coil 22 is arranged in the magnetic gap 33. When an alternating current is supplied to the voice coil 22, under the action of the magnetic field of the magnetic circuit system 30, the voice coil 22 will receive an alternating driving force to generate an alternating motion. Thus, the sound membrane 21 is driven to vibrate together with the vibration diaphragm 41, and the sound membrane 21 pushes the air to generate sound.

Figure 4:
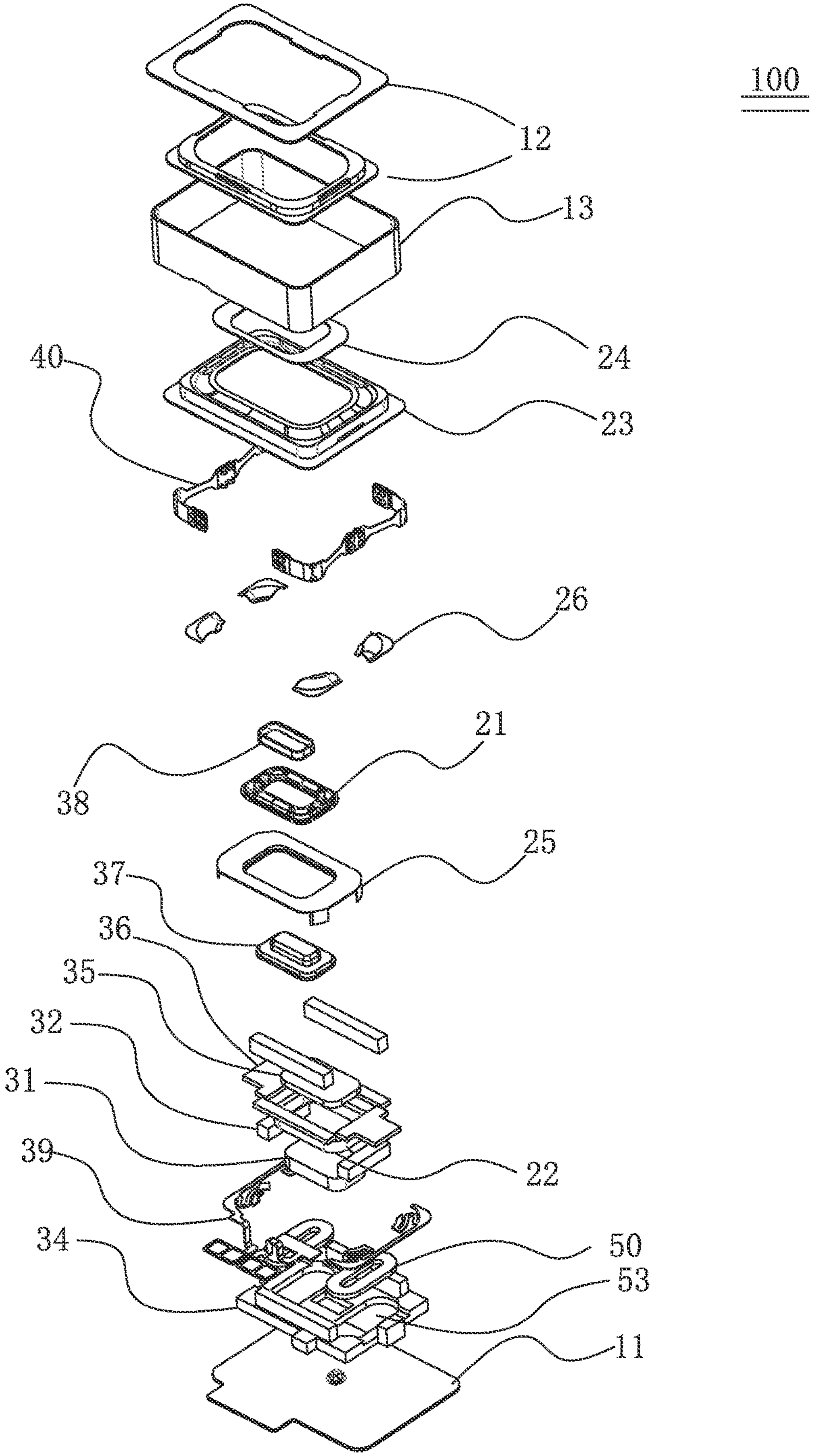
FIG. 4 is an exploded view of the vibration sounding device in FIG. 1.
Figure 5:
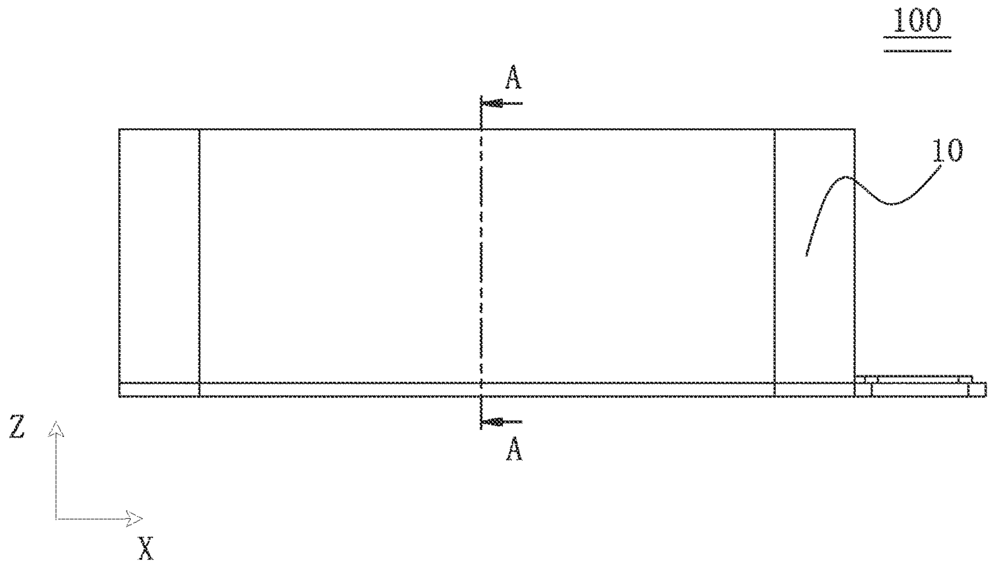
FIG. 5 is a side view of the vibration sounding device.
Figure 6:
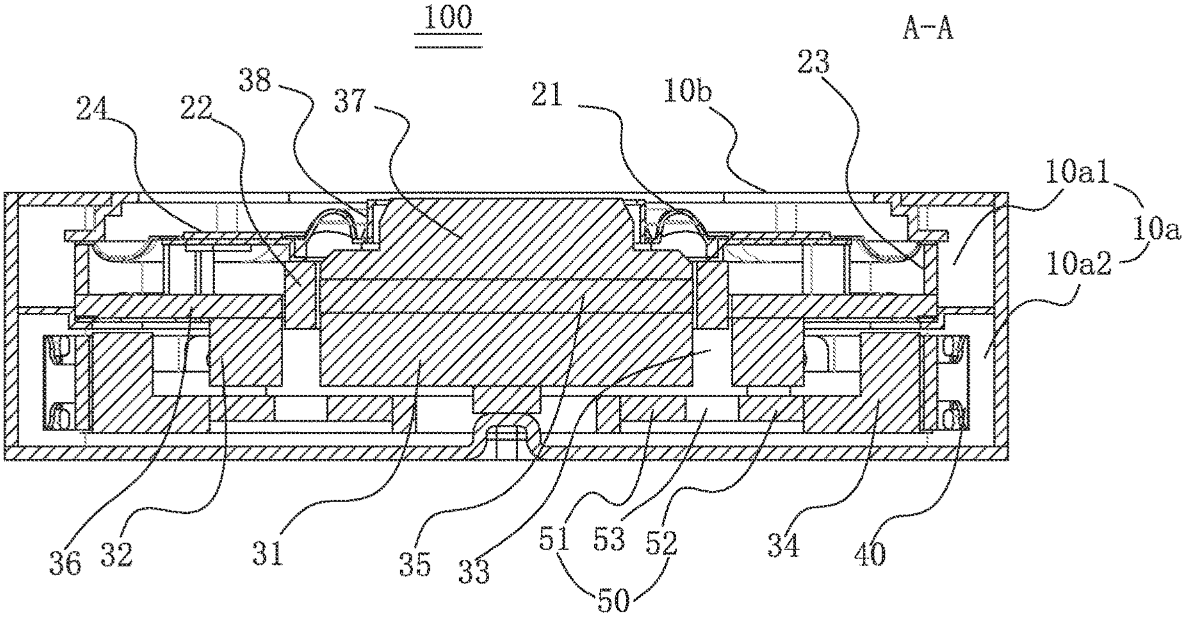
FIG. 6 is a cross-sectional view of the vibration sounding device taken along line A-A in FIG. 5.

Further, referring to FIGS. 4 and 6, the vibration sounding device 100 further includes a drive coil 50 and a weight 34 for accommodating the drive coil 50. The drive coil 50 is used to drive the weight 34 to vibrate in the second direction. An accommodation opening for accommodating the drive coil 50 is formed in the weight 34. One end of spring plate 40 is connected to weight 34, and the other end of spring plate 40 is connected to housing body 10. The drive coil 50 includes a first side edge 51 and a second side edge 52 arranged opposite to the first side edge 51, and in the first direction, the first side edge 51 is arranged opposite to the main magnet 31, and the second side edge 52 is arranged opposite to the secondary magnet 32. The first side edge 51 and the second side edge 52 together form a wire winding hole 53. In the first direction, the wire winding hole 53 and the magnetic gap 33 are arranged opposite to each other to increase the relative force between the drive coil 50 and the main magnet 31 & the secondary magnet 32.

Referring to FIG. 4, the sound membrane 21 extends to form a separator 23 connected to the inner wall of housing, and the separator 23 divides the containment cavity 10*a* into a front cavity 10*a*1 and a rear cavity 10*a*2. The housing body 10 is provided with a sound aperture 10*b* that is connected with the front cavity 10*a*1 to achieve sound output; the rear cavity 10*a*2 can be filled with sound absorbing powder to improve the low frequency acoustic performance of the vibration sounding device 100.

It should be noted that the polarity of the end of the main magnet 31 facing the drive coil 50 is opposite to the polarity of the end of the secondary magnet 32 facing the drive coil 50, so that the drive coil 50 can vibrate.

Further, as shown in FIG. 4, the vibration system 20 further includes a vibration diaphragm 26 disposed opposite the sound membrane 21 in the first direction, a skeleton 25 disposed between the sound membrane 21 and the vibration diaphragm 26, and a dome 24 connected to the skeleton 25. Through dome 24, the strength of skeleton 25 can be strengthened, the torsion resistance and anti-sway ability of skeleton 25 can be improved, and the acoustic performance of the sounding unit can be improved.

Referring to FIG. 4 and FIG. 6, the magnetic circuit system 30 further includes a main pole core 35 attached to the first main magnet 31, a secondary pole core 36 surrounding the main pole core 35 and attached to the secondary magnet 32, and an upper magnet 37 attached to the side of the main pole core away from the main magnet 31. The sounding unit also includes a positioning ring 38, which surrounds and abuts the upper magnet 37.

In the present invention, the weight 30 is suspended in the containment cavity 10*a* through the spring plate 40, and then the drive coil 50 is fixed on the weight 34, in this way, the first side edge 51 of the drive coil 50 is spaced relative to the main magnet 31 along the first direction (vibration direction of the vibration system 20), the second side edge 52 of the drive coil 50 is spaced opposite to the secondary magnet 32 along the first direction. Therefore, the weight 34 will vibrate along the second direction perpendicular to the first direction along with the drive coil 50 under the interaction of the main magnet 31, the secondary magnet 32 and the drive coil 50. That is, the whole drive coil 50 and weight 34 are used as a mover, and the sounding unit with main magnet 31 and secondary magnet 32 is used as a stator, the interaction force between the drive coil 50 and the main magnet 31 and the secondary magnet 32 enables the drive coil 50 to drive the weight 34 to vibrate, thereby realizing the vibration feedback of the device. The device in the technical solution is arranged with both the vibration feedback function and the voice feedback function, which is beneficial to reduce the volume of electronic equipment.

In some embodiments, the spring plate 40 is a split structure, including a first fixed section 41 for fixed connection with the weight 34 and a second fixed section 42 for fixed connection with the housing body 10. The separation between the first fixed section 41 and the second fixed section 42 is also the repeated deformation of the spring plate 40, that is, the force concentration area. The first fixed section 41 and the second fixed section 42 are fixed by laser spot welding, so that the bonding strength between the first fixed section 41 and the second fixed section 42 can be improved. The force of the spring plate 40 in the force concentration area is effectively reduced, thereby ensuring the strength of the spring plate 40 when the vibration sounding device 100 is working. The vibration sounding device 100 is made more reliable, and the service life of the vibration sounding device 100 is improved.

It can be understood that the spring plate 40 can be used in conjunction with other types of spring plate 40, or only one type of spring plate can be used; one spring plate 40 can be used, or multiple spring plate 40 can be used. In some embodiments, two spring plates 40 are provided, and the two spring plates 40 are arranged symmetrically about the weight 34.

Figure 7:
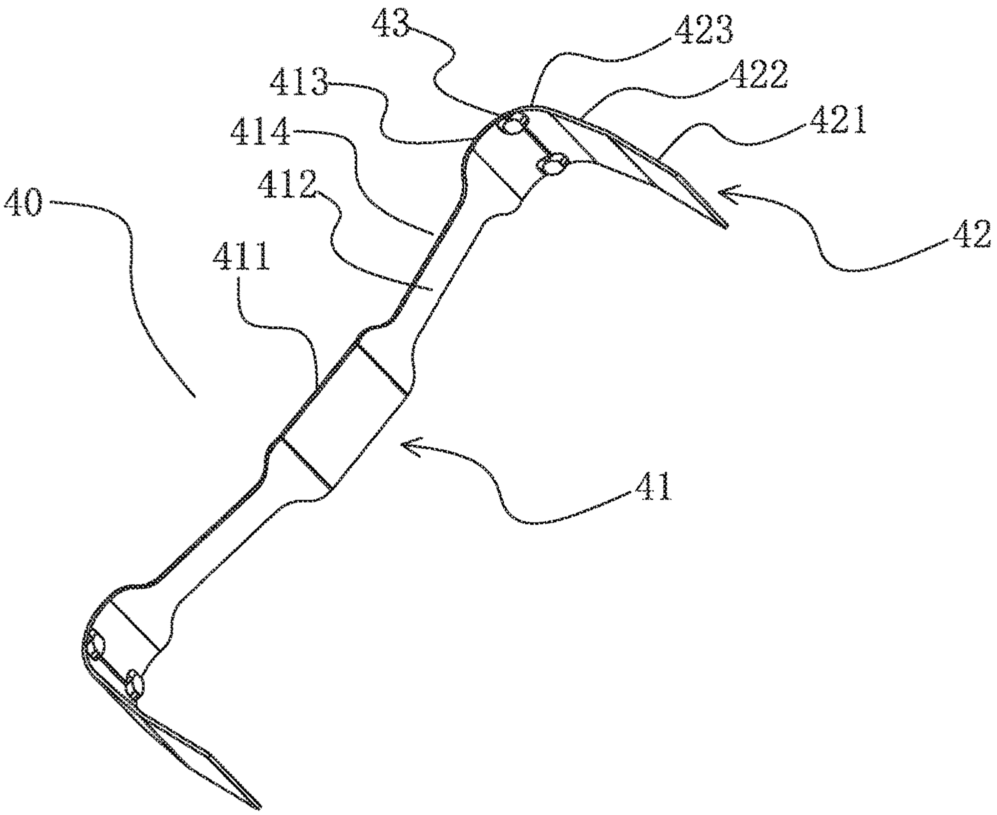
FIG. 7 is an isometric view of a spring plate of the vibration sounding device.
Figure 8:
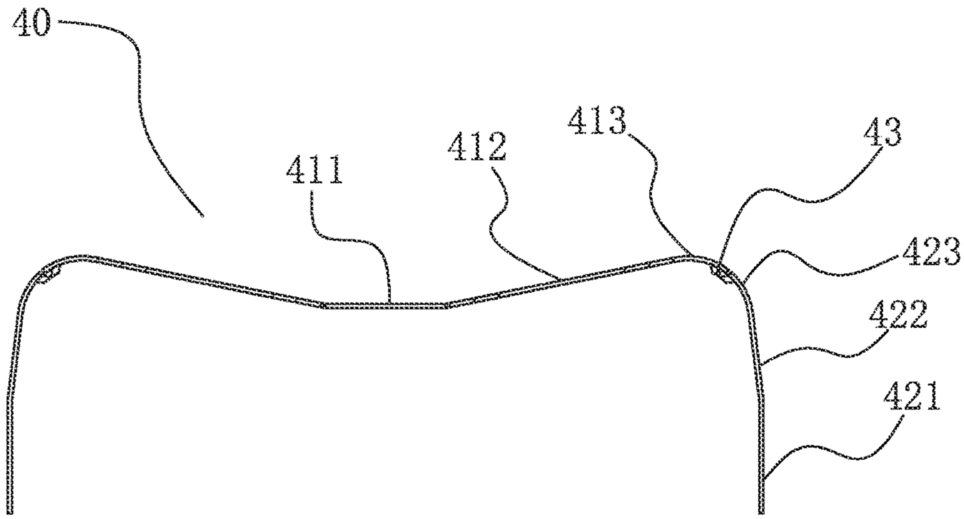
FIG. 8 is a front view of the spring plate.
Figure 9:
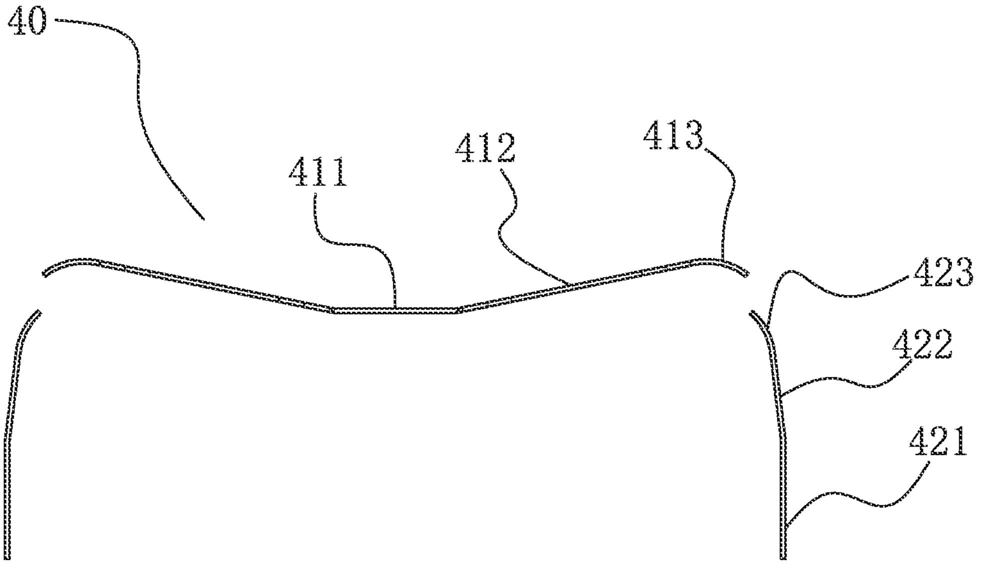
FIG. 9 is an exploded view of the spring plate.

Further, referring to FIGS. 7-9, there are multiple welding points 43 between the first fixed section 41 and the second fixed section 42. Multiple welding points 43 are arranged at intervals along the first direction. In some embodiments, there are two welding points 43. The two welding points 43 are welding together the first fixed section 41 and the second fixed section 42 along the first direction. Therefore, the complexity of the welding process is reduced, and the welding strength is high, which can withstand repeated deformation caused by vibration.

Continuing to refer to FIG. 7-FIG. 9, the first fixed section 41 includes the first main body 411, the first connection arm 412 and the first arc bending part 413. There are two first connection arm 412 and two first arc bending part 413. Two first connection arms 412 and two first arc bending parts 413 are symmetrically disposed on opposite sides of the first main body 411. The opposite ends of the first connection arm 412 are respectively connected to the first main body 411 and the first arc bending part 413. The first main body 411, the first connection arm 412 and the first arc bending part 413 are preferably integrally formed. The first main body 411 is used for fixed connection with weight 34. The first arc bending part 413 is used for fixed connection with the second fixed section 42.

In some embodiments, the extension line of the first connection arm 412 forms an acute angle with the surface of the weight 34. The first arc bending part 413 is farther from the weight 34 than the first main body 411. Preferably, the first main body 411 and the first connection arm 412 are both flat panel structures. The first arc bending part 413 is the arc shape bending structure. Through the corner design of the first arc bending part 413, the length of the strain area of the spring plate 40 is effectively increased, and the length of the force arm of the spring plate 40 is increased. The force of the spring plate 40 is better reduced, the risk of the spring plate 40 breaking due to fatigue is reduced, and the life of the spring plate 40 is increased.

Further, as shown in FIG. 7, a groove 414 is provided on the first connection arm 412, and the groove 414 is recessed and formed on the edge of the first connection arm 412 along the first direction. In some embodiments, two grooves 414 are provided, and the two grooves 414 are symmetrically distributed on opposite sides of the first connection arm 412 along the first direction. The shape of the inner contour surface of the groove 414 is preferably a circular arc shape or a spline curve shape to avoid the formation of structural force concentration. The width of the first connection arm 412 is narrowed at the position corresponding to the groove 414, thereby reducing the rigidity of the first connection arm 412 and softening the first connection arm 412. Under the same driving force, the vibration displacement of the first connection arm 412 will increase, and the vibration effect of the vibration sounding device 100 will be improved.

Further, referring to FIGS. 3, 7, 8 and 9, two second fixed sections 42 are arranged. The two second fixed sections 42 are symmetrically arranged on opposite sides of the first fixed section 41. Two second fixed sections 42 are attached to opposite sides of the housing body 10, respectively. The first fixed section 41 is located in the middle of the two second fixed sections 42. In order to balance the forces in all directions of the weight 34 during the vibration process, to avoid the weight 34 from shifting during the vibration process.

Referring to FIGS. 7-9, the second fixed section 42 includes a second main body 421, a second connection arm 422 and a second arc bending part 423. The opposite ends of the second connection arm 422 are respectively connected to the second main body 421 and the second arc bending part 423. The second main body 421 is used for fixed connection with the housing body 10, and the second arc bending part 423 is used for fixed connection with the first arc bending part 413.

The second main body 421, the second connection arm 422 and the second arc bending part 423 are preferably integrally formed. The second main body 421 and the second connection arm 422 are both average panel body structures. The second arc bending part 423 is the arc shape bending structure. Through the corner design of the second arc bending part 423, the length of the strain area of the spring plate 40 is effectively increased. The length of the spring plate 40 arm is increased, and the force of the spring plate 40 is better reduced. Reduce the risk of spring plate 40 breaking due to fatigue and increase the life of spring plate 40.

In some embodiments, as shown in FIG. 8, the radius of curvature of the first arc bending part 413 and the second arc bending part 423 are equal. In this way, after the first fixed section 41 and the second fixed section 42 are welded and assembled, the first arc bending part 413 and the second arc bending part 423 are combined into a continuous arc shape structure. In order to prevent the force from being concentrated, the spring plate 40 will be broken due to force fatigue.

Figure 3:
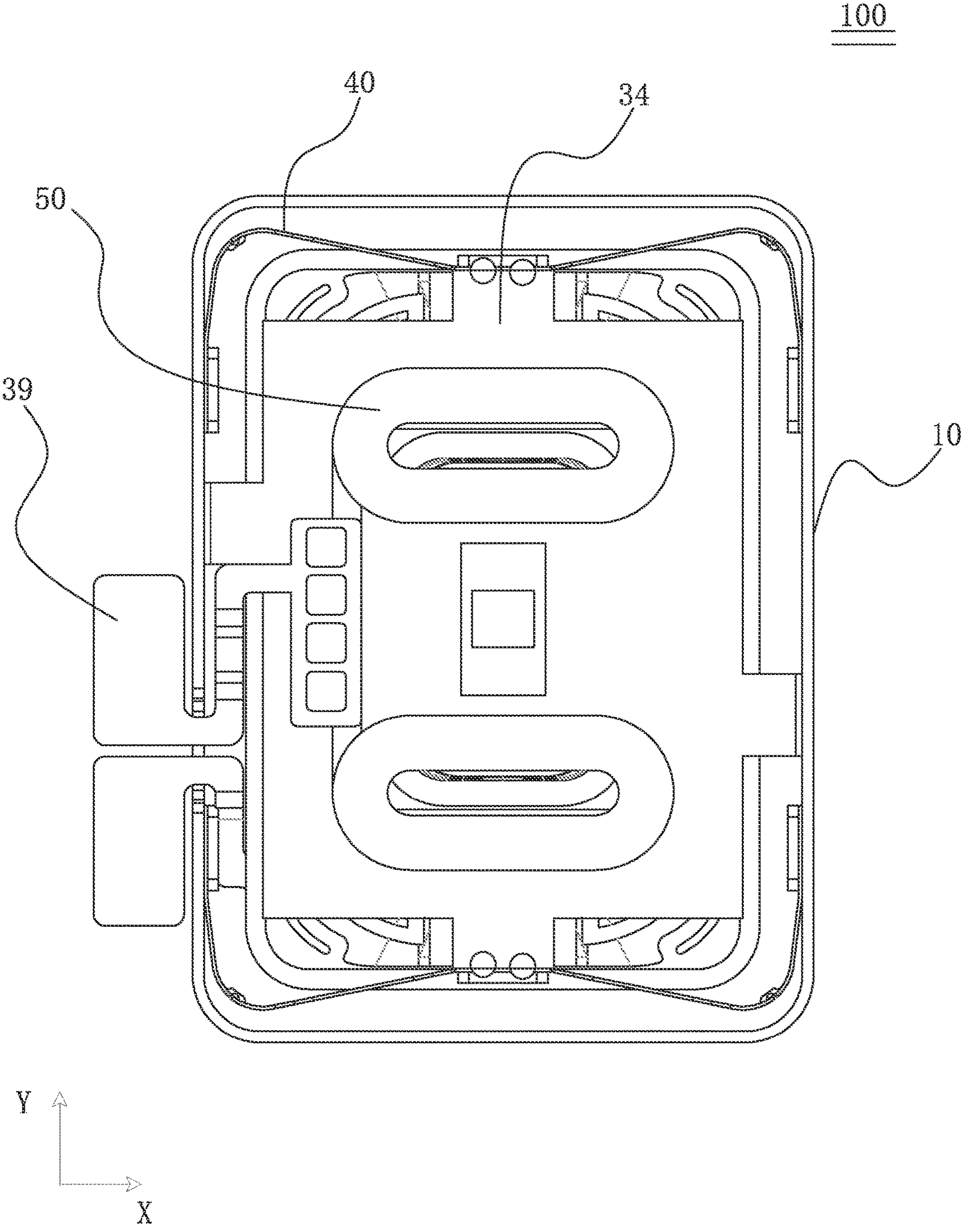
FIG. 3 is a rear view of the vibration sounding device in FIG. 1.

Further, as shown in FIG. 3, the first main body 411 and the weight 34 and the second main body 421 and the housing body 10 are all fixed by welding. At the same time, a soldering piece is fixed at the welding place, and the soldering piece shares the force of the welding area, thereby ensuring the strength of the spring plate 40 when the vibration sounding device 100 is working, and making the vibration sounding device 100 operate more reliably.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration sounding device, comprising:

a housing body with a containment cavity;

a vibration system, including a sound membrane and a voice coil for driving the sound membrane to vibrate;

a magnetic circuit system for driving the vibration system to generate sound in a first direction, including a main magnet and a secondary magnet arranged around the main magnet for forming a magnetic gap, a sounding unit formed by the vibration system and the magnetic circuit system;

a weight;

a drive coil fixed on and movable with the weight along a second direction which is perpendicular to the first direction, including a first side edge spaced from the main magnet, and a second side edge opposite to the first side edge and spaced from the secondary magnet;

a spring plate for connecting with and suspending the weight in the containment cavity, including a first fixed section connecting with the weight and a second fixed section connecting with the housing body; wherein the first fixed section includes a first main body connecting with the weight, two first connection arms and two first arc bending parts symmetrically arranged on opposite sides of the first main body; opposite ends of the first connection arms are respectively connected to the first main body and the first arc bending part;

the second fixed section includes a second main body connecting with the housing body, a second connection arm and a second arc bending part;

opposite ends of the second connection arm are respectively connected to the second main body and the second arc bending part; and the first arc bending part and the second arc bending part are fixed by laser spot welding.

2. The vibration sounding device as described in claim 1, wherein the sound membrane forms a separator connected to an inner wall of the housing body for separating the containment cavity into a front cavity and a rear cavity.

3. The vibration sounding device as described in claim 1, wherein a polarity of an end of the main magnet facing the drive coil is opposite to a polarity of an end of the secondary magnet facing the drive coil.

4. The vibration sounding device as described in claim 1, wherein the first side edge and the second side edge together form a wire winding hole, and in the first direction, the wire winding hole and the magnetic gap are disposed opposite to each other.

5. The vibration sounding device as described in claim 1, wherein the first connection arm includes a groove recessed and formed in an edge of the first connection arm along the first direction.

6. The vibration sounding device as described in claim 5, wherein the grooves are symmetrically distributed on opposite sides of the first connection arm.

7. The vibration sounding device as described in claim 5, wherein an inner contour surface of the groove is a circular arc shape or a spline curve shape.

8. The vibration sounding device as described in claim 1 including two second fixed sections symmetrically arranged on opposite sides of the first fixed section.

9. The vibration sounding device as described in claim 1, wherein a radius of curvature of the first arc bending part and the second arc bending part are equal.

10. The vibration sounding device as described in claim 1, wherein the first main body and the weight and the second main body and the housing body are all fixed by welding.

* * * * *